United States Patent Office 3,766,279
Patented Oct. 16, 1973

3,766,279
PRODUCTION OF ALCOHOLS
Donald M. Fenton, Anaheim, Calif., assignor to Union Oil Company of California, Los Angeles, Calif.
No Drawing. Filed Apr. 7, 1970, Ser. No. 26,407
Int. Cl. C07c 29/14, 31/02
U.S. Cl. 260—638 B          5 Claims

ABSTRACT OF THE DISCLOSURE

Aldehydes are converted to higher molecular weight alcohols by simultaneous aldol condensation and hydrogenation reactions which are catalyzed by a ruthenium-biphyllic ligand catalyst in the presence of a strong base. The reaction is performed under mild conditions at temperatures from 30° to 300° C. and pressures from 1 to about 1000 atmospheres. The aldehyde is contacted with hydrogen in the presence of the catalyst which comprises a mixture of an alkali metal hydroxide and ruthenium in complex association with a biphyllic ligand.

DESCRIPTION OF THE INVENTION

The invention relates to the production of alcohols and in particular relates to production of alcohols from aldehydes by a combined aldol condensation and hydrogenation reaction.

Alcohols are commonly produced from olefins by hydroformylation followed by hydrogenation of the resulting aldehyde. Higher molecular weight alcohols can be produced by the aldol condensation of the aldehydes followed by dehydration and hydrogenation of the aldol product to produce a branched chain alcohol. Such alcohols are useful in the preparation of plasticizers, as solvents, etc.

Strong bases are known to catalyze aldol condensation of aldehydes and some hydroformylation processes incorporate a strong base in the reaction medium to hydroformylate and condense, somultaneously, the aldehyde products. Pat. 3,278,612 suggests that these simultaneous reactions of hydroformylation and aldol condensation could be combined with hydrogenation by the use of various biphyllic ligand-transition metal catalysts. Complexes of ruthenium and biphyllic ligands, however, are relatively inactive for hydroformylation so that the hydroformylation cannot be achieved with such catalysts at yields sufficient to justify their consideration. It is also found that, in the presence of carbon monoxide, the hydrogenation activity of the ruthenium-biphyllic ligand catalyst is substantially impaired and high yields of completely saturated alcohol products are not attainable when the hydrogenation-dehydration of aldol condensates is attempted in the presence of carbon monoxide.

Many hydroformylation reactions produce the simple aldehyde products. Examples of such comprises the hydroformylation of olefins with a rhodium triphenylphosphine or triphenylphosphite catalyst. These reactions produce, predominantly, an aldehyde product with substantially no saturation of the olefin feed or of the product. This is desirable in many instances because it affords a wider flexibility of the process to produce aldehyde products which can be hydrogenated to the simple alcohols, can be dimerized to produce higher molecular weight alcohols, or can be oxidized to produce fatty carboxylic acids. When higher molecular weight alcohols are desired from these aldehydes, it has been necessary that the aldol condensation and hydrogenation be performed as separate and independent reactions. This results in a plurality of processing steps which encumber the synthesis of higher molecular weight alcohols.

It is an object of this invention to provide a process for the aldol condensation of aldehydes and the dehydration-hydrogenation of the resultant condensates.

It is also an object of this invention to permit said reactions to be performed simultaneously in a single stage process.

It is an additional object of this invention to provide a stable and highly active catalyst for such reactions.

Other and related objects will be apparent from the following description of the invention.

It has now been discovered that the combination of a strong base and a ruthenium-biphyllic ligand complex exhibits a high degree of activity for simultaneous aldol condensation and dehydration-hydrogenation of the resultant condensate to produce higher molecular weight alcohols from aldehydes. It has further been discovered that this activity of the catalyst can only be achieved in the absence of carbon monoxide. The discovery that carbon monoxide poisons or deactivates the hydrogenation activity of the catalyst was quite surprising in view of the teachings of Pat. 3,278,612, which suggests that such a catalyst would be active for the simultaneous hydroformylation-aldol condensation-hydrogenation reactions to produce high molecular weight olefin alcohols directly from hydrocarbon olefins. The deactivating influence which carbon monoxide exerts on this catalyst appears to be unique which the ruthenium catalyst since carbon monoxide does not exert a similar deactivating effect on cobalt-biphyllic ligand complex catalysts.

The aldehydes which can be condensed and dehydrated-hydrogenated in accordance with the process of this invention comprise any acyclic aldehyde having from 2 to about 20 carbons and include the saturated and unsaturated aldehydes. Examples of suitable aldehydes include acetaldehyde, propionaldehyde, butyraldehyde, valeraldehyde, caproic aldehyde, enanthylic aldehyde, caproic aldehyde, pelargonic aldehyde, undecylic aldehyde, lauric aldehyde, tridecanoic aldehyde, myristic aldehyde, pentadecanoic aldehyde, palmitic aldehyde, marjoric aldehyde, stearic aldehyde, nondecylic aldehyde, arachidic aldehyde, as well as the branched chain derivatives thereof, e.g., isobutyraldehyde, isocaprylic aldehyde, isoundecylic aldehyde, etc. Examples of the unsaturated aldehydes include those having monoolefinic chains such as acrolein or crotonic, isocrotonic, vinyl acetic, methacrylic, tiglic, angelic, senecioic, hexenic, turacrylic, hypogeic, oleic, elaidic aldehydes, etc.

The reaction is performed under liquid phase conditions and, when the aldehyde comprises a liquid at the reaction conditions, the aldehyde can be used in excess to provide the liquid reaction medium. If desired, however, any suitable organic liquid can be used as a reaction solvent; preferably organic solvents which are inert to the reaction conditions, the reactants, the catalyst and the products are employed. Examples of suitable solvents which can be used in accordance with my invention include hydrocarbons such as the aromatic, aliphatic or alicyclic hydrocarbons, ethers, etc.

Examples of suitable hydrocarbons that can be employed in the solvents include aromatic hydrocarbons such as benzene, toluene, xylene, ethylbenzene, Tetralin, etc.; aliphatic hydrocarbons such as butane, pentane, isopentane, hexane, isohexane, heptane, octane, isooctane, naphtha, gasoline, cyclopentane, cyclohexane, methylcyclopentane, Decalin, indane, etc.

Ethers can also be employed as the reaction solvent, e.g., diisopropyl ether, di-n-butyl ether, ethylene glycol diisobutyl ether, methyl o-tolyl ether, ethylene glycol dibutyl ether, diisoamyl ether, methyl p-tolyl ether, methyl m-tolyl ether, dichloroethyl ether, ethylene glycol diisoamyl ether, diethylene glycol diethyl ether, ethylbenzyl ether, diethylene glycol diethyl ether, diethylene glycol dimethyl ether, ethylene glycol dibutyl ether, ethylene glycol diphenyl ether, triethylene glycol diethyl ether, diethylene glycol di-n-hexyl ether, tetraethylene glycol dimethyl ether, tetraethylene glycol dibutyl ether, etc.

Preferably, the solvent used is a polar solvent to provide solubility for the strong base and, most preferably, an aqueous solvent is employed by incorporating from 5 to about 95, preferably from 10 to 50 weight percent water in the reaction zone in admixture with the aldehyde reactant or any of the aforementioned solvents. Entirely miscible solvent mixtures are preferred to simplify the mass transfer consideration; however, immiscible solvent mixtures can be used with sufficient agitation to insure interdispersion of the phases during reaction.

The catalyst comprises a complex between ruthenium and a biphyllic ligand. The biphyllic ligand is a compound of phopshorus or arsenic having at least 1 atom with a pair of electrons capable of forming a coordinate covalent bond with a metal atom and simultaneously having the ability to accept the electron from the metal thereby imparting additional stability to the resulting complex. Biphyllic ligands can comprise organic compounds having at least about 3 carbons and containing arsenic or phosphorus in a trivalent state. Of these, the phosphorus compounds, i.e., the phosphines or phosphites are preferred; however, the arsines can also be employed. In general, these biphyllic ligands have the following structure:

$$E(R)_3$$

wherein

E is trivalent arsenic or phosphorus;
R is the same or different hydrocarbyl group selected from the class consisting of aryl containing from 6 to about 10 carbons and alkyl containing from 1 to about 10 carbons; and wherein at least on of said R groups is aryl.

Examples of suitable biphyllic ligands having the aforementioned structure and useful in my invention with the ruthenium are the following: phenyldimethyl phosphine, diphenylethyl arsine, phenyldibutyl arsine, cumyldiisopropyl phosphine, dixylylhexyl phosphine, triphenyl phosphine, tritauryl arsine, tridiuryl phosphine, phenyldiisopropyl arsine, phenyldiamyl phosphine, diethylnaphthyl phosphine, p-hexylphenyldixylyl phosphine, etc. Of the aforementioned, the diaryl alkyl phosphines are preferred and the triaryl phosphines are most preferred.

The catalyst used in the reaction zone comprises a complex between ruthenium and the aforementioned biphyllic ligand. The ruthenium can be added to the reaction zone in any suitable form, e.g., as the metal, as a complex, a salt or oxide. Examples of suitable additives which can be used include ruthenium salts such as the salts of strong inorganic acids or aliphatic and aromatic acids, e.g., ruthenium nitrate, ruthenium chloride, ruthenium bromide, ruthenium iodide, ruthenium fluoride, ruthenium sulfate, etc., as well as ruthenium oxide, ruthenium metal and powder or finely subdivided form, etc. The ruthenium can be added as a solid, as a solution, or can be distended on a suitable inert support by impregnating the support with any of the aforementioned sources of ruthenium. Examples of suitable inert supports include activated carbon, alumina, silica, aluminosilicates, titania, zirconia, etc. Such supports should, as the solvents, be inert to the catalyst, reactants and products under the reaction conditions. In addition, the solids should preferably be finely subdivided, e.g., having particle sizes passing about 20 mesh but retained on about 400 mesh standard screen size and can have specific surface areas from about 10 to about 1000 square meters per gram.

The biphyllic ligand can be used in amounts from about 0.5 to about 100 times the stoichiometric equivalent of the ligand which is in complex association with the ruthemium catalyst. Generally, the complex can contain from about 1 to about 3 ligands per atom of the ruthenium metal. Preferably, the amount of biphyllic ligand employed is in excess of the stoichiometric equivalent of that contained in the ruthenium complex and excess quantities from about 2 to about 100 times the stoichiometric amount can be used.

The second component of the catalyst comprises the alkaline additive which can be an alkali metal, alkaline earth metal hydroxide or a trisubstituted amine having from 3 to about 21 carbons. Examples of such are sodium hydroxide, potassium hydroxide, lithium hydroxide, rubidium hydroxide, calcium hydroxide, barium hydroxide, magnesium hydroxide.

Organic trisubstituted amines are sufficiently basic to be used in the process and the full substitution on the nitrogen atom insures that the amines are essentially non-reactive with the reactants or products under the process conditions. Examples of such amines include trihydrocarbyl amines having alkyl, alkenyl, cycloalkyl or aryl substituents on the nitrogen, e.g. trimethyl, triethyl, triisopropyl, triheptyl, ethyldioctyl, methyldidecyl, diethylbutenyl, trihexenyl amines, etc.; triphenyl, tritolyl, diphenylxylyl, methyldicumenyl, diamylphenyl, tricyclohexyl, methylcyclophenyldibutyl amines, etc. Heterocyclic amines wherein the nitrogen is fully substituted can also be used such as pyridine and alkyl derivatives thereof, e.g., methylpyridine, amylpyridine, octylpyridine, etc. Bicyclo amines having from 3 to about 12 carbon atoms and containing one or two nitrogen atoms in a bridgehead position can be used and examples of these are:

1-azabicyclo(2.2.1)heptane;
1,4-diazabicyclo(2.2.1)heptane;
1,7-diazabicyclo(2.2.1)heptane;
1-azabicyclo(3.2.1)octane;
1,7-diazabicyclo(3.2.1)octane;
1-azabicyclo(3.3.1)nonene;
1-azabicyclo(2.2.2)octane;
1,3-diazabicyclo(2.2.2)octane;
1,3-diazabicyclo(3.3.1)nonene;
1,5-diazabicyclo(3.3.1)nonene;
1,4-diazabicyclo(2.2.2)octane;
1-azabicyclo(4.3.1)decane;
1,5-diazabicyclo(3.2.2)nonene;
1,5-diazabicyclo(3.3.3)undecane, etc.

The alkaline material should be added in amounts sufficient to impart a basic condition to the reaction medium. In general, amounts from about 0.01 to about 20, preferably from about 1 to about 5 weight percent of the reaction can be employed. The ruthenium biphyllic ligand complex is employed in catalytic quantities which can be amounts from about 0.0001 to about 10, preferably from about 0.01 to about 1 weight percent.

The reaction is performed under relatively mild condition including temperatures from about 30° to 300° C., preferably from about 70° to about 250° C. Sufficient pressure is used to maintain the reaction medium in liquid phase. Although atmospheric pressure can be used with most reaction mediums and aldehyde reactants, the rate of reaction is increased by superatmospheric pressures and, therefore, pressures from about 1 to about 1000 atmospheres, and preferably from about 10 to about 300 atmospheres are used. The preceding conditions are maintained by conventional means. Since the reaction is exothermic, the reaction temperature can be maintained by suitable cooling of all or a portion of the reaction zone contents using heat exchange surfaces such as cooling coils which can be installed in the reaction zone or can be used externally by continuously or intermittently removing all or a portion of the reaction zone contents and passing the withdrawn portion into contact with the heat exchange surfaces and returning the resultant cooled reaction medium to the reaction zone. The pressure can be maintained by the pressure of the reactant hydrogen supplied to the reaction zone or, if desired, a suitable inert gas can also be charged to the reaction zone to reduce the partial pressure of hydrogen and thereby reduce somewhat the hydrogenation reactivity. A suitable gas for this purpose would be nitrogen.

The process can be conducted continuously or batchwise, however, continuous processing is preferred. In the latter technique, the catalyst is passed to the reaction zone in a suitable solvent or in excess of the aldehyde and hydrogen is introduced into contact with the reaction media and catalyst in the reaction zone. A continuous withdrawal of the liquid phase in the reaction zone can be employed; this material can then be reduced in pressure to remove dissolved gases which can be recycled, cooled and then distilled to recover the desired alcohol product. Because the reaction conditions are mild, the alcohol product can remain in the reaction zone without encountering undue degradation to less desired products. Therefore, batchwise operation can be practiced by introducing the aldehyde, hydrogen and any inert gas that may be employed into contact with the catalyst solution until a sufficient inventory product is accumulated in the reaction zone. Thereafter the reaction can be discontinued and the product recovered by suitable steps, typically distillation.

The major product of the reaction is the alcohol of the dimerized aldehyde. Other products that are produced in minor quantities include the dehydrated alcohol of the dimerized aldehyde, unreacted aldehyde, and slight amounts of the simple alcohol from hydrogenation of the aldehyde. The simple alcohol can be removed and the other intermediate products can be recycled for complete conversion to the desired saturated alcohol of the dimerized aldehyde.

The invention will now be illustrated by the following examples:

Example 1

The combined dimerization and dehydration-hydrogenation of an aldehyde is illustrated by the following procedure. A one-gallon autoclave is charged with 300 milliliters butyraldehyde, 2 grams ruthenium trichloride tristriphenylphosphine, 3 grams triphenylphosphine, 10 grams sodium hydroxide and 200 milliliters of water. The autoclave is closed and pressured to 800 p.s.i. with hydrogen and is then heated to 110° C. and maintained at that temperature for 6 hours while stirring. Upon completion of the reaction, the autoclave is cooled and the liquid contents are analyzed to reveal the following distribution of reactants and products:

| | Weight percent |
|---|---|
| Butyraldehyde | 0.6 |
| Butanol | 13 |
| 2-ethylhexanal | 31 |
| 2-ethylhexenal | 16.5 |
| 2-ethylhexanol | 33 |
| 2-ethylehexenol | 1.6 |

Example 2

A half-gallon capacity autoclave is charged with 0.5 gram ruthenium trichloride, 5 grams triphenylphosphine, 10 grams sodium hydroxide, 200 milliliters water and 200 milliliters butyraldehyde. The autoclave is pressured to 800 p.s.i. with hydrogen and heated to and maintained at 110° C. for 6 hours. Upon completion of the reaction period, the autoclave is cooled, depressured, and the liquid contents are analyzed to discover that the weight content of products comprises 29 percent butanol, 10 percent 2-ethylhexanal, 20 percent 2-ethylhexanol, and 31 percent other byproducts.

When the reaction is repeated with the addition of 20 grams of sodium hydroxide, the weight distribution of products is: 48 percent butanol, 7 percent 2-ethylhexenol, 43 percent 2-ethylhexanol and 2 percent other products.

When the reaction is again repeated with the substitution of 0.5 gram of 5 weight percent ruthenium on alumina for the ruthenium trichloride, the weight distribution of products is: 32 percent butanol, 26 percent 2-ethylhexenal, 87 percent 2-ethylhexanol and 34 percent others.

When the experiment is again repeated with the addition of 5 grams sodium chloride, the weight distribution in the products is: 37 percent butanol, 15 percent 2-ethylhexenal, 30 percent 2-ethylhexanol and 18 percent others.

Example 3

The following example illustrates the results obtained when the reaction is attempted in the presence of carbon monoxide. The half-gallon capacity autoclave is charged with 1 gram ruthenium trichloride, 5 grams triphenylphosphine, 10 grams sodium hydroxide, 300 milliliters water and 300 milliliters butyraldehyde. The autoclave is pressured to 100 p.s.i. with carbon monoxide and then to 1000 p.s.i. with hydrogen. The reactants are heated to 150° C. and maintained at that temperature for 5 hours while stirring. Upon completion of the reaction period, the autoclave is cooled and the contents are removed and analyzed. No 2-ethylhexanol is observed in the product which comprises chiefly 2-ethylhexenal.

The experiment is repeated, however, the carbon monoxide is omitted and it is observed that the product is chiefly 2-ethylhexanol with no detetchable quantities of 2-ethylhexenal.

The aforedescribed experiments illustrate laboratory investigations of the reaction of my invention. The presently preferred mode of practice of the invention comprises the continuous processing described in the preceding specification. As apparent to those skilled in the art, the reactions can be conducted employing any of the aforementioned components of the catalyst in lieu of the specific components employed in the examples. Similarly, as obvious to those skilled in the art, the invention can be practiced using any of the aforementioned aldehydes and employing reaction conditions within those described in the preceding specification. Examples of such substitutions include replacement of the sodium hydroxide with equal weight amounts of calcium hydroxide, potassium hydroxide or triethylene diamine, 1,4-diazabicyclo(2.2.2)octane, etc.; replacement of butyraldehyde with equal molar amounts of acrolein, acetaldehyde, isocaprylic aldehyde or palmitic aldehyde, the latter being added as a solution in ethylene glycol dibutyl ether. Examples of catalyst substitution that can readily be made include replacement of the triphenylphosphine with tritolylphosphite, diethylphenylarsine, etc.

I claim:

1. The method for conversion of aliphatic aldehydes to alcohols having twice the carbon atoms of the aldehydes which comprises reacting, in the absence of carbon monoxide, an aliphatic hydrocarbyl aldehyde having from 2 to about 20 carbons with hydrogen in the presence of a liquid reaction medium containing from 10 to 50 weight percent water, a catalyst consisting essentially of ruthenium trichloride tris (triphenylphosphine) and an excess of triphenylphosphine comprising from 2 to about 100 times the amount of said triphenylphosphine in said ruthenium trichloride tris (triphenylphosphine), at a temperature from about 70° to 250° C. and a pressure from about 10 to about 300 atmospheres, sufficient to maintain said reaction under liquid phase conditions and in the presence of from 0.01 to about 20 weight percent of an alkaline material selected from the class consisting of alkali metal and alkaline earth metal hydroxides and N-tri-substituted hydrocarbyl amines having 3 to about 21 carbons.

2. The method of claim 1 wherein said aldehyde is a saturated fatty acid aldehyde.

3. The method of claim 1 wherein said alkaline material is an alkali metal hydroxide.

4. The method of claim 3 wherein said alkali metal hydroxide is sodium hydroxide.

5. The method of claim 1 wherein said temperature is about 110° C.

References Cited

UNITED STATES PATENTS

| | | | |
|---|---|---|---|
| 3,454,644 | 7/1969 | Dewhirst | 260—658 B |
| 3,278,612 | 10/1966 | Greene | 260—632 HF |
| 3,274,263 | 9/1966 | Greene et al. | 260—632 HF |
| 3,102,899 | 9/1963 | Cannell | 260—632 HF |
| 3,530,190 | 9/1970 | Olivier | 260—632 HF |
| 3,555,098 | 1/1971 | Olivier et al. | 260—632 HF |

HOWARD T. MARS, Primary Examiner

J. E. EVANS, Assistant Examiner

U.S. Cl. X.R.

260—601 R